Jan. 1, 1929.  1,697,399
A. MEYER
PROTECTION OF THE THRUST BEARING OF STEAM TURBINES
Filed March 6, 1925
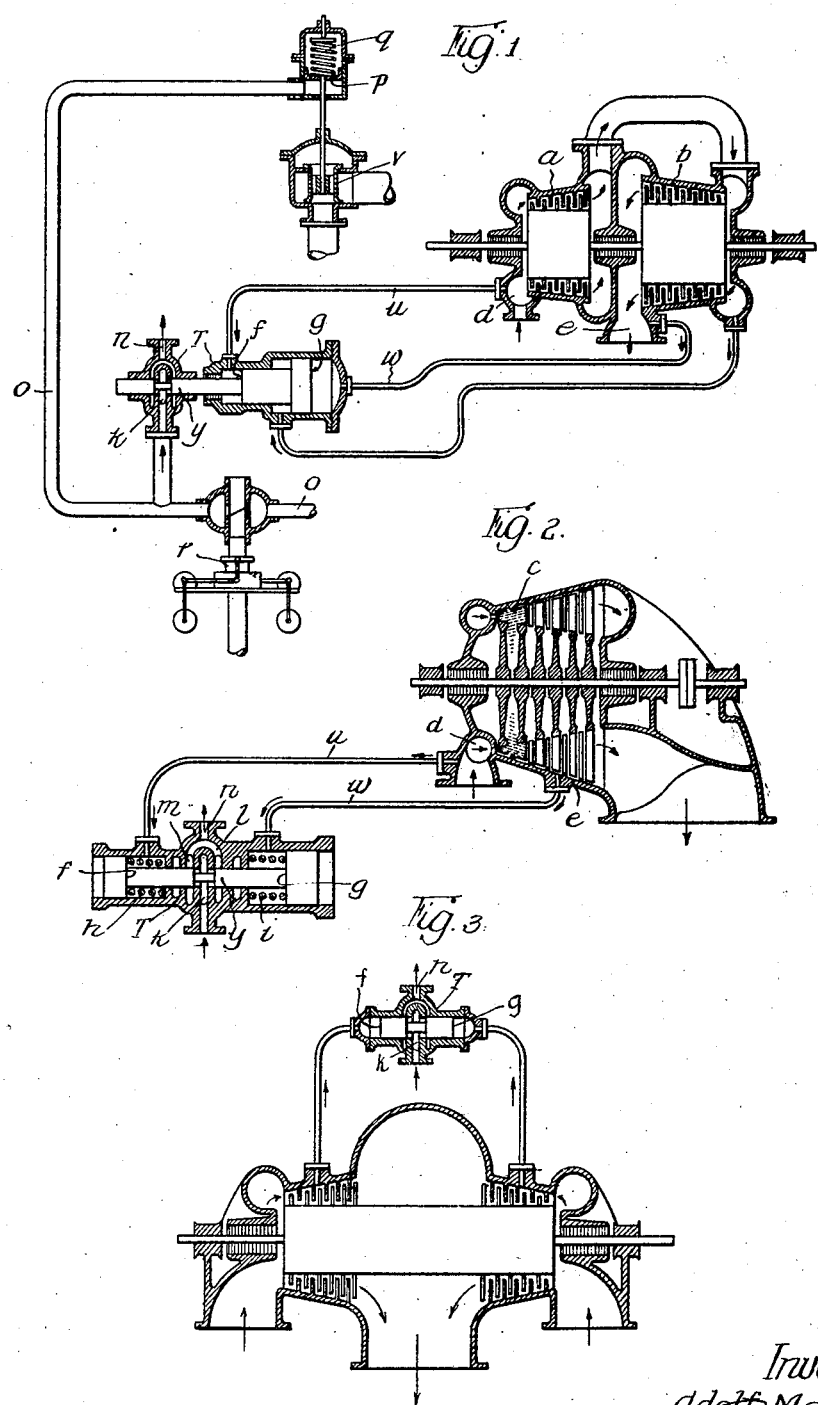

Patented Jan. 1, 1929.

1,697,399

UNITED STATES PATENT OFFICE.

ADOLF MEYER, OF ZURICH, SWITZERLAND, ASSIGNOR TO AKTIENGESELLSCHAFT BROWN BOVERI & CIE., OF BADEN, SWITZERLAND.

PROTECTION OF THE THRUST BEARING OF STEAM TURBINES.

Application filed March 6, 1925, Serial No. 13,485, and in Germany July 21, 1924.

The thrust bearing of steam turbines is generally designed so as to be effective under all ordinary working conditions, i. e. from no-load to overload, and also for working on exhaust. Under these circumstances impulse turbines do not require any special end thrust compensating devices, but reaction turbines are provided with such devices in the form of balance pistons or blade sections of opposite inclination. The natural or artificial balancing of the end thrust may, however, be upset in both types of turbine by various circumstances. It may happen, for example, that the blades of the rotor become so dirty as to reduce the area of the passages and thereby disturb the balance. The restriction of the area of the passages may also be caused by the blades rubbing owing to an accident. Water hammer is the most dangerous cause of the disturbance of end thrust balance owing to its frequency and violence. Variations in the end thrust from these causes result from the fact that they produce an abnormal distribution of pressure in the blading. If there are no such disturbances the pressures in the blading are proportional to the load.

The risk referred to is obviated, according to the present invention, by providing that the steam pressures of at least two different points of the turbine blading act either directly or indirectly on the governing or safety devices of the turbine and cause them to act when the proportion of these pressures varies.

In order that the invention may be clearly and readily understood, reference will now be made to the accompanying drawings, on which, Fig. 1 is a diagrammatic sectional view of a reaction turbine provided with two sets of blading disposed in opposition so that their end pressures balance at any load;

Fig. 2 a similar view of an impulse turbine, the protection means according to the invention being shown to a larger scale than in Figs. 1 and 3; and Fig. 3 a similar view of a double ended turbine.

In the diagram shown in Fig. 1, the reference characters $a$ and $b$ designate two blading sections of a turbine which are arranged so that in operation the axial thrusts on the shaft $s$ will counterbalance, thus relieving the thrust bearings of heavy pressures. Inlet of steam to the turbine is controlled by a valve $v$ which closes under pressure from a spring $q$ and is opened by pressure of oil supplied under a piston $p$ from a servo line $o$. Pressure of oil in line $o$ is controlled by a governor $r$ of well known form, which is responsive to speed variations of the turbine. If, in the operation of the turbine, a quantity of water is condensed therein, a water ring, as indicated at $c$ in Fig. 2, may be formed and which, owing to its greater mass, must move through the turbine much more slowly, under the same drop in pressure, than does the steam. The velocity ratio may be, for example, 1:10. The consequence is that the steam will be dammed in front of the water ring but will flow rapidly away behind it. The full steam pressure may therefore exist in front of the water ring and the full vacuum behind it, thereby producing an end pressure which may damage the thrust bearing and under certain circumstances may cause complete destruction of the blading.

In order to provide for protection of the machine under such conditions, I utilize a control device which will operate automatically, under the unbalanced pressure conditions in the turbine, to reduce the inlet of steam to a safe quantity. Such device is designated generally in all the figures by the reference character T. In the forms here illustrated it comprises a differential piston having opposing faces $f$ and $g$ and arranged in a cylinder to which steam connections $u$ and $w$ are taken from points $d$ and $e$ of the turbine, so that the pressures in the turbine at those points may be rendered effective upon the faces $f$ and $g$. The areas of said faces are inversely proportional to the proper balancing pressures at the points $d$ and $e$. In the form shown in Fig. 2, springs $h$ and $i$ act on the piston to maintain it in its mid-position when it is subjected to pressures of the normal relationship. The piston is connected to a valve member $y$ which controls passage of oil between the chambers $k$ on the one side, and $m$ and $l$ on the other side. The inlet chamber $k$ is in communication with the oil line $o$, and the chambers $l$ and $m$ are in communication with an outlet $n$, the arrangement being such that on movement of the piston $y$ from its mid-position, a path is opened from the chamber $k$ to the outlet $n$ through chamber $l$ or $m$, according to the direction in which the piston is displaced. Thereupon, an amount of pressure fluid can escape from the pipe *o* of the control system, with the result that the pressure of oil effective under piston *p* is reduced, permitting a closing movement of valve *v*, which reduces the steam admission to the turbine. Thus, in the event the difference between the pressures in the turbine at the connection points *d* and *e* becomes abnormal, as from the effect of water passing through the blading as described above, the steam supplied to the turbine will be reduced to a safe amount, or entirely cut off, depending on the manner in which the inlet valve is operated.

In double ended turbines as shown in Fig. 3 in which the blading acts in parallel, two equal pressures may be used for controlling purposes, in which case the two piston areas are, of course, equal.

In the arrangement illustrated in Fig. 1, three pressures act on one piston, so that, for example, the fouling of a portion of the blading will affect the safety device through the action of the two nearest pressure pipes.

The reduction in the quantity of steam flowing through the turbine reduces the pressure all through the turbine. In this way the differences in pressure, which cause end thrust, will be reduced, and when the valve is completely closed, zero.

The reduction of the pressures, and consequently the reduction of the end thrust to zero may be effected suddenly instead of gradually by bringing about operation of the usual quick closing stop valve of the turbine, but has the disadvantage that after the removal of the cause of the trouble the turbine must be restarted by hand, whereas if the admission valve governing gear is acted upon, it will automatically allow the load to be taken by the turbine again as soon as the cause of the disturbance has been removed.

What I claim is:—

1. Method of operating balanced-thrust turbines, which comprises regulating supply of steam to the turbines in response to variation in the pressure differential between opposing axial pressures.

2. Method of operating multiple cylinder turbines of the balanced-thrust type, which comprises regulating the steam supply by variations of the pressure differential between the inlet and outlet pressures of different cylinders.

3. Method of operating multiple cylinder turbines, which comprises passing steam in opposite axial directions through different cylinders to counterbalance the axial thrust on the rotor shaft, and regulating the steam supply to the turbine in response to variation of the differential between inlet and outlet pressures in different cylinders.

4. Turbine apparatus comprising, in combination, rotor sections, a rotor shaft carrying said sections, casing portions for directing actuating fluid axially of different sections in opposite directions, means for varying supply of actuating fluid, and governing apparatus for said means, said governing apparatus being responsive to variation of pressure as between different sections.

5. In turbine apparatus, in combination, a rotor shaft, different rotor sections carried thereon, casing portions cooperating with said sections to direct actuating fluid in different axial directions through different sections, means for varying supply of actuating fluid, and governing apparatus effective on said means, said governing apparatus being responsive to variations of the pressure differential between different casing portions.

6. In turbine apparatus, in combination, a rotor shaft, different rotor sections carried thereby, different casing portions cooperating with the rotor sections to direct actuating fluid in different axial directions, governing apparatus responsive to changes in the differential of the inlet and outlet pressures of different casing portions, and means responsive to said governing apparatus for controlling supply of actuating fluid to the turbine.

7. The combination with a steam turbine having thrust-balancing features, of a control device responsive to variations in the pressure differential between different points in the turbine, and means responsive to operation of said device for varying steam inlet to the turbine.

8. The combination with a steam turbine, of a device for controlling end thrust in the turbine, said device including a movable member operably responsive to variations of the pressure differential between different portions of the turbine and means responsive to operation of said member for varying steam admission to the turbine.

9. In steam turbine apparatus, steam supply valve means therefor, means including a fluid connection responsive to speed conditions of said apparatus to control the action of said valve means, and means responsive to pressure difference conditions at different points in said apparatus and operable by such pressure difference independently of speed conditions of said apparatus to effect pressure difference in said fluid connection.

10. In steam turbine apparatus, steam supply valve means therefor, means including a fluid connection responsive to speed conditions of said apparatus to control the action of said valve means, means responsive to pressure difference conditions at different points in said apparatus and operable by such pressure difference independently of speed conditions of said apparatus to effect pressure difference in said fluid connection, and valve means intermediate said pressure difference responsive means and said fluid connection to control the pressure difference therein.

11. In turbine apparatus, rotor sections, a rotor shaft carrying said sections, casing portions for directing actuating fluid in different directions in different rotor sections, valve means for varying the supply of actuating fluid, and governing apparatus for said means responsive to variation of pressure between different rotor sections.

12. In turbine apparatus, opposed rotor sections, a rotor shaft carrying said sections, casing portions for directing actuating fluid in different directions in said rotor sections, means for varying the supply of actuating fluid for said turbine, and governing means therefor responsive to pressure differential taken at different portions of said casing.

Dated this 5th day of February, 1925.

AD. MEYER.